W. J. FRANCKE.

FLEXIBLE COUPLING.

APPLICATION FILED DEC. 4, 1912.

1,115,299.

Patented Oct. 27, 1914.

3 SHEETS—SHEET 1.

WITNESSES

H. T. Walker

Rudolph Hostetz

INVENTOR

WILLIAM J. FRANCKE

BY Munn & Co.

ATTORNEYS

W. J. FRANCKE.

FLEXIBLE COUPLING.

APPLICATION FILED DEC. 4, 1912.

1,115,299.

Patented Oct. 27, 1914.

3 SHEETS—SHEET 2.

WITNESSES

H. D. Walker

Rud. G. Hoster

INVENTOR

WILLIAM J. FRANCKE

BY Munn & Co

ATTORNEYS

W. J. FRANCKE.

FLEXIBLE COUPLING.

APPLICATION FILED DEC. 4, 1912.

1,115,299.

Patented Oct. 27, 1914.

3 SHEETS—SHEET 3.

WITNESSES

H. J. Walker

[illegible]

INVENTOR

WILLIAM J. FRANCKE,

BY Munn & Co

ATTORNEYS

UNITED STATES PATENT OFFICE.

WILLIAM J. FRANCKE, OF NEW BRUNSWICK, NEW JERSEY, ASSIGNOR TO THE FRANCKE [illegible], OF NEW BRUNSWICK, NEW JERSEY, A CORPORATION OF NEW JERSEY.

FLEXIBLE COUPLING.

[illegible] Specification of Letters Patent. Patented Oct. 27, 1914.

Application filed December 4, 1912. Serial No. 734,850.

To all whom it may concern:

Be it known that I, WILLIAM J. FRANCKE, a citizen of the United States, and a resident of New Brunswick, in the county of Middlesex and State of New Jersey, have invented a new and Improved Flexible Coupling, of which the following is a full, clear, and exact description.

The invention relates to flexible couplings such as shown and described in the Letters Patent of the United States, No. 1,029,355, granted to me June 11, 1912.

The object of the present invention is to provide a new and improved flexible coupling arranged to insure the proper transmission of power from one shaft to another even though such coupled shafts be out of line or out of center, to reduce the wear of the parts of the coupling to a minimum and to allow convenient replacing of worn out or broken flat springs or shims without requiring removing of the keepers of the flexible connections. For the purpose mentioned, use is made of coupling members adapted to be secured on the adjacent ends of two shafts to be coupled together, and flexible connecting members connecting the coupling members with each other, each flexible connecting member being formed of a plurality of superimposed flat springs or shims, wearing plates and keepers held on the ends of the said springs and carrying the said wearing plates, the latter projecting beyond keepers and overlying the outermost springs or shims. Provision is also made to allow lengthwise movement of the superimposed flat springs in their keepers and to hold the [illegible] against such movement. Use is also made of means to prevent the keeper [illegible] from moving endwise.

A practical embodiment of the invention is represented in the accompanying drawings forming a part of this specification, in which similar characters of reference indicate corresponding parts in all the views.

Figure 1:
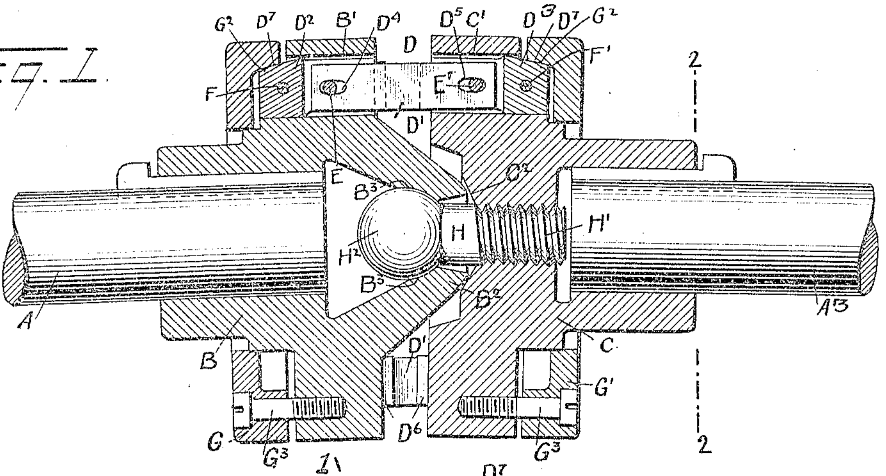
Figure 2:
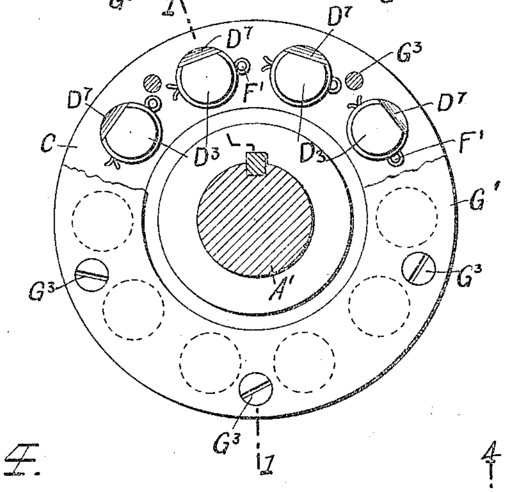
Figure 4:
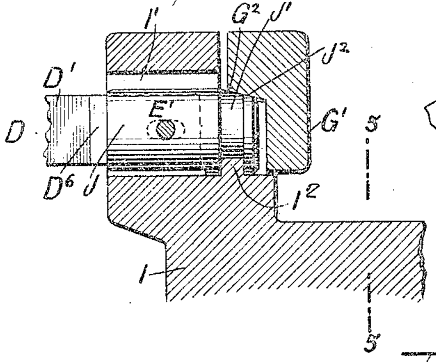
Figure 5:
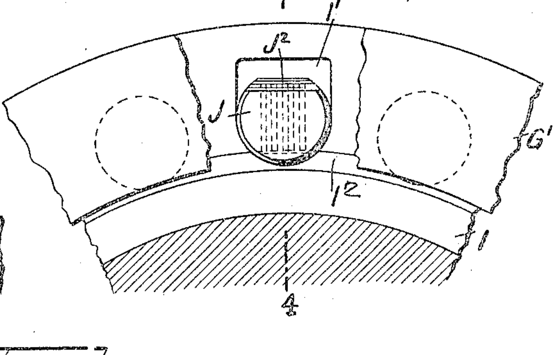
Figure 3:
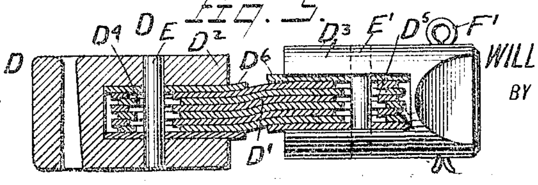
Figure 6:
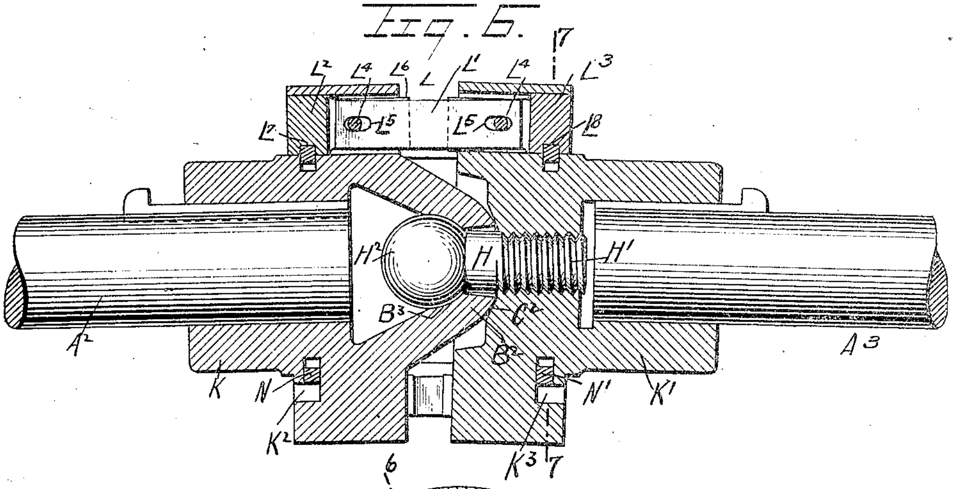
Figure 7:
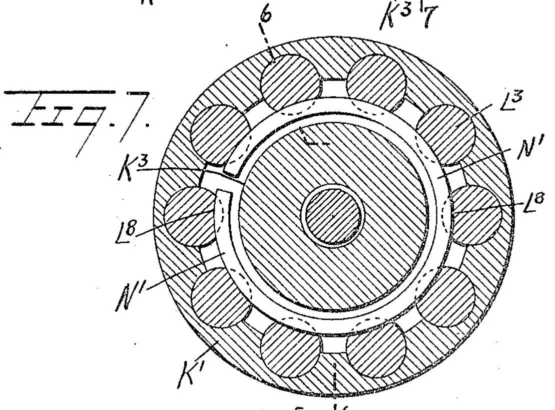
Figure 8:
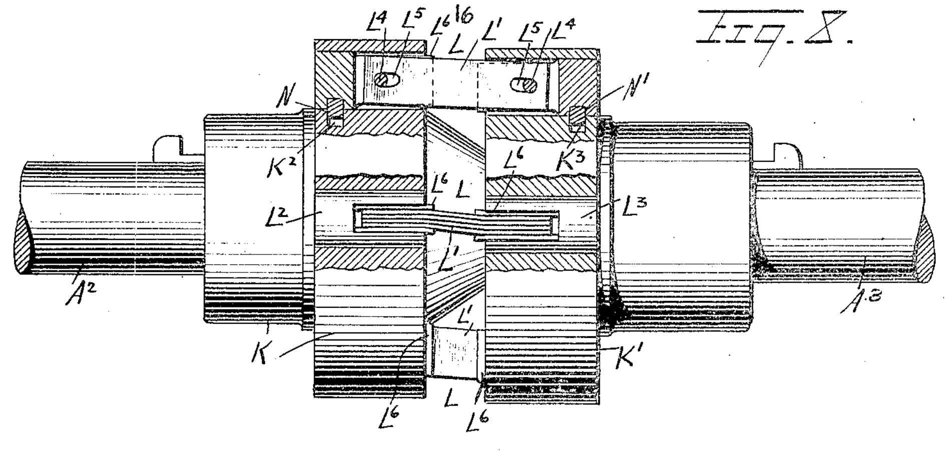
Figure 9:
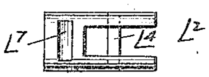
Figure 10:
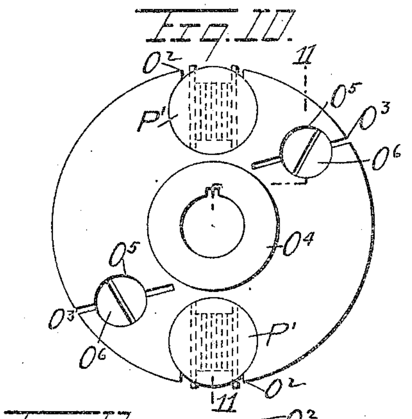
Figure 11:
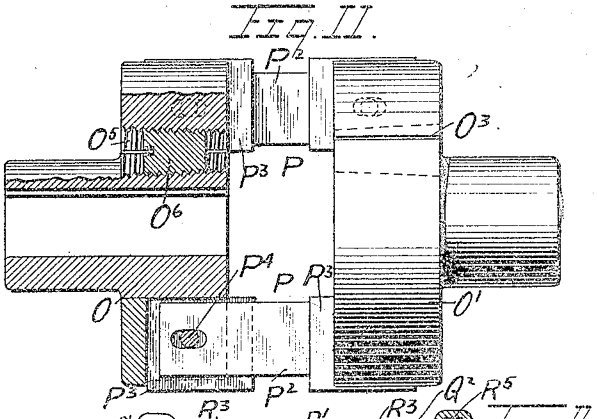
Figure 12:
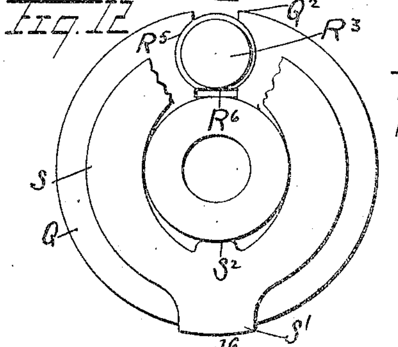
Figure 13:
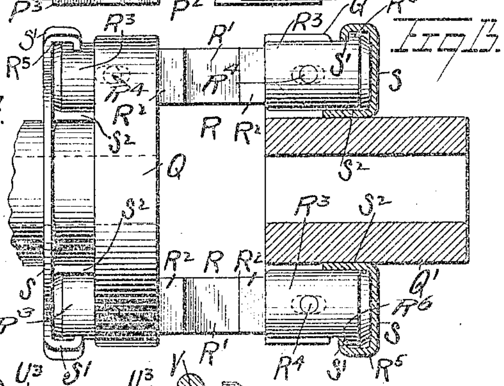
Figure 14:
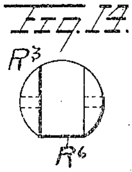
Figure 15:
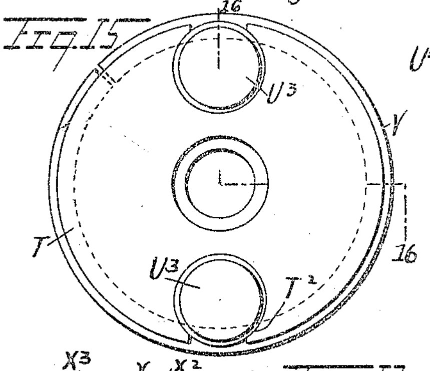
Figure 16:
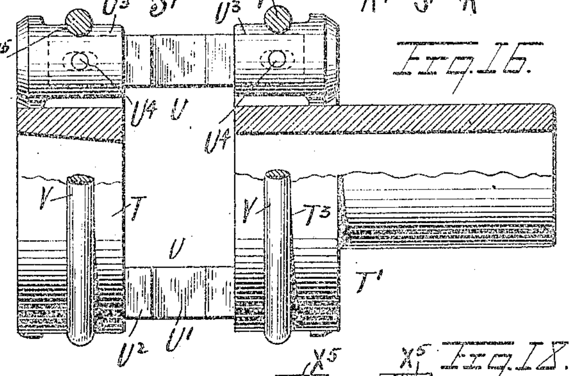
Figure 17:
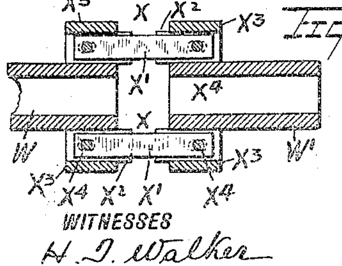
Figure 18:
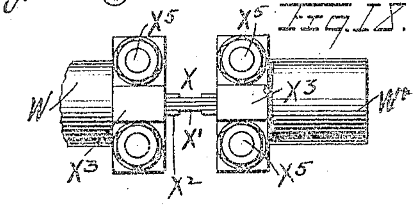
Figure 19:
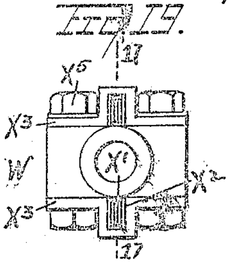

Figure 1 is a sectional side elevation of the flexible coupling as applied, and showing the coupled shafts out of line, the section being on the line 1—1 of Fig. 2; Fig. 2 is a cross section of the same on the line 2—2 of Fig. 1, part of the retaining ring being broken out; Fig. 3 is an enlarged sectional plan view of one of the coupling members, one of the keepers being shown in plan; Fig. 4 is a sectional side elevation of a modified form of the means for holding the keepers against lengthwise and turning movement, the section being on the line 4—4 of Fig. 5; Fig. 5 is a cross section of the same on the line 5—5 of Fig. 4, part of the retaining ring being broken out; Fig. 6 is a sectional side elevation of a modified form of the flexible coupling as applied and showing the coupled shafts out of line, the section being on the line 6—6 of Fig. 7; Fig. 7 is a cross section of the same on the line 7—7 of Fig. 6; Fig. 8 is a side elevation of the same, parts being in section and the shafts being out of center; Fig. 9 is an inverted plan view of one of the keepers of the modified form shown in Figs. 6, 7 and 8; Fig. 10 is a face view of another modified form of the flexible coupling; Fig. 11 is a side elevation of the same, one of the flanges being shown in section on the line 11—11 of Fig. 10; Fig. 12 is a face view of another modified form of flexible coupling, part of the retaining ring being broken out; Fig. 13 is a side elevation of the same, one of the flanges being shown in section; Fig. 14 is an end elevation of one of the keepers of the modified form shown in Figs. 12 and 13; Fig. 15 is a face view of another modified form of the flexible coupling; Fig. 16 is a side elevation of the same, parts being in section, on the line 16—16 of Fig. 15; Fig. 17 is a reduced sectional side elevation of another modified form of the coupling, the section being on the line 17—17 of Fig. 19; Fig. 18 is a plan view of the same; and Fig. 19 is an end elevation of the same.

The flexible coupling illustrated in Figs. 1, 2 and 3 is used to couple the adjacent ends of the shafts A and A′ together, and on the said adjacent ends of the shafts A and A′ are keyed or otherwise secured coupling members B and C, preferably in the form of disks flexibly connected with each other at their adjacent faces by flexible connecting members D. Each of the flexible connecting members D is formed of a plurality of superimposed flat steel springs or shims D′ fitting at their ends into the forks of keepers $D^2$, $D^3$ provided with transverse pins E, E′ passing through elongated slots $D^4$, $D^5$ arranged in a series of superimposed flat springs or shims D′, as will be readily understood by reference to Fig. 3. Wearing plates $D^6$ are held in each of the keepers $D^2$, $D^3$ and overlie the outermost flat springs or shims D′, the said wearing plates $D^6$ projecting a short distance beyond the inner or opposite ends of the keepers $D^2$, $D^3$. The pins E pass through the inner ends of the wearing plates $D^6$ and hold the latter against lengthwise movement while the springs or shims D′ are free to move lengthwise owing to the pins E, E′ passing through the elongated slots $D^4$, $D^5$. By the arrangement described the wearing plates $D^6$ take up the wear incident to the movement of the springs or shims D′ and the wearing plates are extended beyond the inner ends of the keepers to provide a large flexible wearing surface for the adjacent flexible springs or shims, and the projecting ends of the wearing plates $D^6$ do not present an abrupt non-flexible edge to the adjacent springs or shims D′, and hence the springs or shims are not liable to break away under lateral tension, as indicated, for instance, in Fig. 3. The keepers $D^2$ and $D^3$ are preferably cylindrical and fit into correspondingly-shaped apertures B′, C′ formed in the coupling members B and C and arranged in a circle, the center of which coincides with the axis of the corresponding shaft A or A′. The keepers $D^2$ and $D^3$ project through the apertures B′, C′ a distance beyond the outer faces of the coupling members B and C, and through the projecting ends of the keepers pass cotter pins F, F′ abutting against the outer faces of the coupling members B and C, thus holding the keepers against movement in the coupling members B and C. The outer projecting ends of the keepers $D^2$ and $D^3$ are provided with flattened or beveled portions $D^7$ onto which fit correspondingly-shaped flanges $G^2$ of retaining rings G and G′ fastened by bolts or other means $G^3$ to the corresponding coupling members B and C. By the arrangement described the keepers $D^2$ and $D^3$ of the flexible connecting members D are held against turning and endwise shifting in the openings B′ and C′ of the coupling members B and C.

By the construction described the parts can be readily assembled or disassembled for repairs or other purposes, as it is only necessary to disconnect the retaining rings G, G′ from the coupling members and to withdraw the cotter pins F, F′ for removal of the flexible connections D from the coupling members. It will further be noticed that by the use of the wearing plates $D^6$ the keepers $D^2$, $D^3$ are protected against wear, and in case of undue wear of the springs or shims D′ and the plates $D^6$ they can be replaced by new ones without requiring replacing or renewing of the keepers.

The coupling members B and C are centrally connected with each other by two ball and socket joints, of which one prevents the coupling members from moving too far toward each other and the other ball and socket joint holds the keepers from moving apart. The two ball and socket joints are formed as follows: On the inner face of the coupling member C is formed centrally a concave seat $C^2$ on which is adapted to be seated a spherical hollow bearing $B^2$ projecting centrally from the inner face of the coupling member B. The seat $C^2$ and the hollow bearing $B^2$ form a ball and socket joint to limit the movement of the coupling members toward each other. Centrally in the coupling member C screws the threaded end H′ of a pin H terminating in a ball $H^2$ seated on an annular spherical seat $B^3$ formed on the inner wall of the hollow bearing $B^2$ thus providing a ball and socket joint which holds the coupling members against moving apart. It is understood that the central connection between the coupling members B and C allows the said coupling members to flex but prevents the same from moving apart, thus relieving the cotter pins F and F′ of undue strain. The central connection described limits the movement of the coupling members B and C toward each other, thus preventing buckling of the springs or shims D′

In the modified form shown in Figs. 4 and 5 each coupling member I is provided with openings I′ for the reception of the keepers J of the flexible connections D having the flat springs or shims D′ and the wearing plates $D^6$ as above described, and engaged by the corresponding pin E or E′. The outer projecting end of each keeper J is provided with a groove J′ into which projects an annular shoulder $I^2$ on the corresponding coupling member I so as to hold the keepers J against movement in a lengthwise direction. The outer end of each keeper J is also provided with a flattened or beveled portion $J^2$ engaged by the flange $G^2$ of the corresponding retaining ring G or G′, as above described.

In the modified form shown in Figs. 6, 7, 8 and 9, the adjacent ends of the shafts $A^2$ and $A^3$ to be coupled are provided with coupling members K and K′ flexibly connected with each other by flexible connecting members L similar to the flexible connecting member D previously described. The connecting members L are formed of flat superimposed shims or springs L′, held in the forked ends of keepers $L^2$, $L^3$ by the use of transverse pins $L^4$ passing through elongated slots $L^5$ in the springs L′, the outermost of the springs L′ being superimposed by wearing plates $L^6$ similar to the wearing plates $D^6$ previously described, and held against movement by the pins $L^4$. The keepers $L^2$ and $L^3$ are provided at their under faces with recesses $L^7$, $L^8$ into which extend split rings N and N′ held in annular recesses $K^2$, $K^3$ formed in the coupling members K and K'. By the arrangement described the keepers $L^2$, $L^3$ are held by the rings N and N' against movement lengthwise and are also prevented from turning in the coupling members K and K'. The coupling members K and K' are centrally connected with each other by the two ball and socket joints previously described relative to Figs. 1 and 2, so that further description of the same is not deemed necessary.

In the modified form shown in Figs. 10 and 11 the coupling members O and O' are provided with recesses $O^2$ into which fit the keepers P' of the flexible connecting members P each formed of flat superimposed springs or shims $P^2$ and wearing plates $P^3$ held in the keepers P' by pins $P^4$, as above described. In order to fasten the keepers P' in place in the openings $O^2$, the following arrangement is made: Adjacent the openings $O^2$ the coupling members O and O' are provided with splits or cuts $O^3$ extending inwardly from the peripheral face of the coupling members to the hub $O^4$ thereof, and a threaded and tapering opening $O^5$ is arranged lengthwise in the coupling members O and O' and pass through the cut or split $O^3$, as plainly indicated in Fig. 10, and in each opening $O^5$ screws a tapering plug $O^6$ to force the portions of the coupling member O' or O adjacent the opening $O^2$ against the outer face of the keeper P' to clamp the latter in position in the coupling member. It will be noticed that on unscrewing the screw plugs $O^6$, the keepers P' are unclamped to permit of conveniently removing the flexible connections P from the coupling members O and O' whenever it is desired to make repairs or replace parts as the case may be.

In the modified form shown in Figs. 12, 13 and 14, the coupling members Q and Q' are connected with each other by flexible connecting members R each formed of superimposed flat springs or shims R', wearing plates $R^2$ and keepers $R^3$ carrying pins $R^4$ engaging the springs R' and wearing plates $R^2$, the same as above described in reference to Fig. 3. The keepers $R^3$ are held in openings $Q^2$ formed in the coupling members Q and Q', and the outer ends of the keepers $R^3$ are provided on top with flanges $R^5$ engaged by hooks S' of retaining rings S encircling the hubs of the coupling members Q and Q'. The retaining rings S are provided along their inner edges with lugs $S^2$ fitting flattened portions $R^6$ on the under sides of the keepers $R^3$ to hold the latter against turning. At the same time the hooks S' hold the flexible connecting members R against longitudinal movement on the coupling members Q and Q'.

In the modified form shown in Figs. 15 and 16 the coupling members T and T' are connected with each other by flexible connecting members U, each formed of flat superimposed springs or shims U', wearing plates $U^2$ and keepers $U^3$ in which the ends of the springs U' and the wearing plates $U^2$ are held by pins $U^4$, the same as above described in reference to Fig. 3. The keepers $U^3$ fit into recesses $T^2$ formed in the coupling members T and T', and the said keepers are provided on top with recesses $U^5$ engaged by rings V also engaging annular grooves $T^3$ in the peripheral faces of the coupling members T and T', thus holding the keepers $U^3$ against lengthwise as well as against turning movement.

In the modified form shown in Figs. 17, 18 and 19, the coupling members W, W' are connected with each other by flexible connecting members X each formed of superimposed flat springs X', wearing plates $X^2$ and keepers $X^3$ in which the ends of the springs X', and the wearing plates $X^2$ are fastened by pins $X^4$, the same as above described in reference to Fig. 3. The keepers $X^3$ in this case are in the form of caps fastened by bolts $X^5$ to the coupling members W and W'.

Having thus described my invention, I claim as new and desire to secure by Letters Patent:

1. In a flexible coupling, the combination of coupling members adapted to be secured to the adjacent ends of two shafts, and flexible connecting members connecting the said coupling members with each other, each flexible connecting member having a plurality of superimposed flat springs, keepers on the ends of the said superimposed flat springs, the keepers engaging the said coupling members, and wearing plates held in each of the said keepers and overlying the outermost flat springs, the said wearing plates projecting beyond the ends of the said keepers.

2. In a flexible coupling, the combination of coupling members adapted to be secured to the adjacent ends of two shafts, and flexible connecting members connecting the said coupling members with each other, each flexible connecting member having a plurality of superimposed flat springs, keepers on the ends of the said superimposed flat springs, the keepers engaging the said coupling members, and wearing plates held in each of the said keepers and overlying the outermost flat springs, the said wearing plates projecting beyond the ends of the said keepers, the said wearing plates being held against lengthwise movement in the said keepers and the ends of the said flat springs having lengthwise movement in the said keepers.

3. In a flexible coupling, the combination of coupling members adapted to be secured to the adjacent ends of two shafts, and flexible connecting members connecting the said coupling members with each other, each flexible connecting member having a plurality of superimposed flat springs provided with elongated slots at the ends, keepers on the ends of the said flat springs, pins on the said keepers and extending through the said slots in the flat springs, the said keepers engaging the said coupling members, and wearing plates held in each keeper and overlying the outermost flat springs, the said wearing plates projecting beyond the inner ends of the said keepers and the said wearing plates being engaged by the said pins and held by the pins against movement in the keepers.

4. In a flexible coupling, the combination of coupling members adapted to be secured to the adjacent ends of two shafts, flexible connecting members connecting the said coupling members with each other, each flexible connecting member having a plurality of superimposed flat springs, keepers on the ends of the said superimposed flat springs, the keepers engaging the said coupling members, and wearing plates held in each of the said keepers and overlying the outermost flat springs, the said wearing plates projecting beyond the ends of the said keepers, and means on the coupling members and engaging the said keepers of each flexible connecting member to hold the latter against turning.

5. In a coupling, the combination of coupling members adapted to be secured to the adjacent ends of two shafts, flexible connecting members extending lengthwise in the direction of the axis of the coupling and connecting the said coupling members with each other, each flexible connecting member having superimposed flat springs and keepers on the ends of the said flat springs, the keepers engaging the said coupling members, split rings for securing the said keepers in the said members, and double ball and socket joints connecting the said coupling members with each other, one of the joints limiting the movement of the coupling members toward each and the other joint limiting the movement of the coupling members from each other and relieving the said split rings of undue strain.

6. In a coupling, the combination of coupling members adapted to be secured to the adjacent ends of two shafts, each of the said coupling members having openings arranged in a circle, the center of which coincides with the axis of the corresponding shaft, flexible connecting members each formed of a plurality of flat superimposed springs and keepers at the ends of the said springs, the keepers engaging the said openings and having transverse grooves, and split rings in the said coupling members and extending into the said grooves.

In testimony whereof I have signed my name to this specification in the presence of two subscribing witnesses.

WILLIAM J. FRANCKE.

Witnesses:
JOHN P. DAVIS,
PHILIP D. ROLLHAUS.